March 29, 1949. H. KNUTSON 2,465,594
STEAM WINCH
Filed Feb. 5, 1945 6 Sheets-Sheet 1

INVENTOR.
HARRY KNUTSON
BY
G. H. Braddock
ATTORNEY

March 29, 1949.  H. KNUTSON  2,465,594
STEAM WINCH

Filed Feb. 5, 1945  6 Sheets-Sheet 2

INVENTOR.
HARRY KNUTSON
BY
G. H. Braddock
ATTORNEY

March 29, 1949.  H. KNUTSON  2,465,594
STEAM WINCH

Filed Feb. 5, 1945  6 Sheets-Sheet 3

*INVENTOR.*
HARRY KNUTSON
BY
*G. H. Braddock*
ATTORNEY

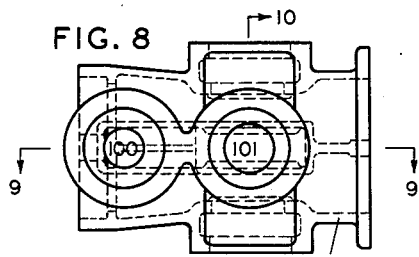
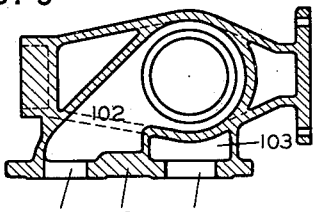
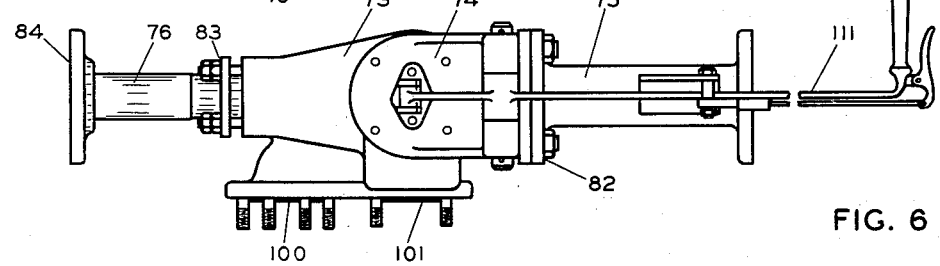
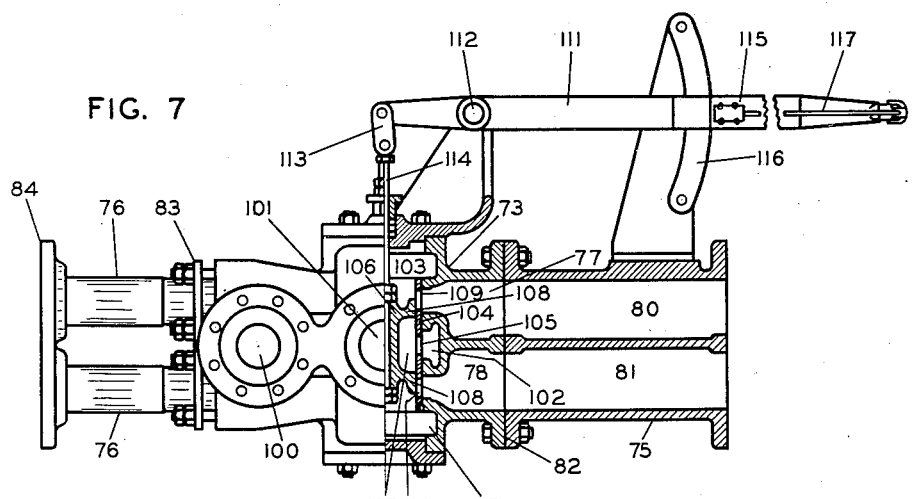
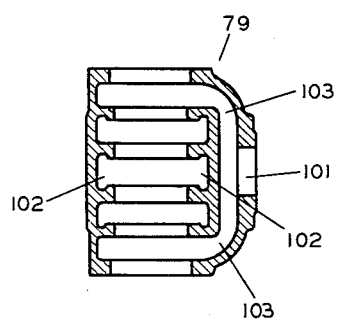

March 29, 1949.  H. KNUTSON  2,465,594
STEAM WINCH

Filed Feb. 5, 1945  6 Sheets-Sheet 5

INVENTOR.
HARRY KNUTSON
BY
G. H. Braddock
ATTORNEY

INVENTOR.
HARRY KNUTSON
BY
*G. H. Braddock*
ATTORNEY

Patented Mar. 29, 1949

2,465,594

UNITED STATES PATENT OFFICE 2,465,594

STEAM WINCH

Harry Knutson, St. Paul, Minn., assignor to American Hoist & Derrick Co., St. Paul, Minn., a corporation of Delaware Application February 5, 1945, Serial No. 576,200

3 Claims. (Cl. 254—150)

This invention has relation to material handling apparatus of the character including a winch. More explicitly, the invention relates to material handling apparatus, especially designed for use on cargo transporting vessels, of the type commonly known as steam winches.

An object of the invention is to provide material handling apparatus constituted as a steam winch wherein will be incorporated various novel features and characteristics of construction designed to render the material handling apparatus an improvement generally over material handling apparatus constituted as steam winches heretofore known.

A further object is to provide a material handling apparatus, consisting of a winch, steam engine mechanisms and a brake or brakes, etc., for actuating and regulating said winch, which will include new and improved features and characteristics of construction designed with purposes in view of improving the structure of material handling apparatus of the present type and of rendering the material handling apparatus efficient and satisfactory in operation for a long period of time.

A further object is to provide in the material handling apparatus various improved features and characteristics of construction which will be novel both as individual entities of said material handling apparatus and in combination with each other.

A further object is to provide material handling apparatus constituted as a steam winch which will incorporate a novel and improved lubricating construction and arrangement for steam engine mechanisms of the material handling apparatus or winch.

And a further object is to provide a material handling apparatus or steam winch of construction as hereinafter set forth.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawings forming a part of this specification,

Fig. 6 is a plan view detailing a throttle assembly of the material handling apparatus;

Fig. 7 is a view partially in side elevation and partially in longitudinal section of the disclosure of Fig. 6;

Fig. 8 is a side elevational view detailing a throttle body of the throttle assembly of Figs. 6 and 7;

Fig. 9 is a detail sectional view, taken on line 9—9 in Fig. 8;

Fig. 10 is a detail sectional view, taken on line 10—10 in Fig. 8;

Figure 1:
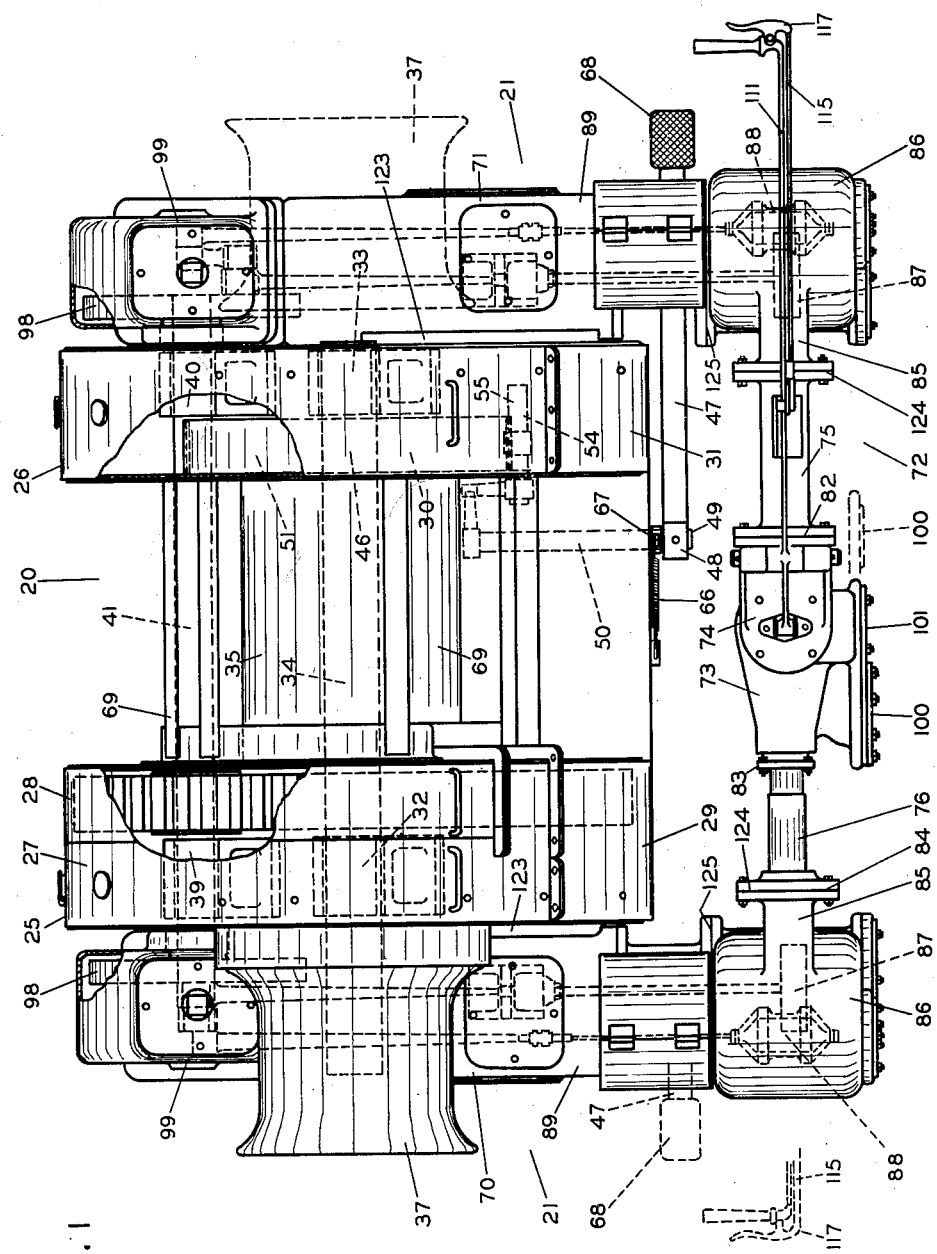
Fig. 1 is a top plan view, partially broken away, of material handling apparatus including the features and characteristics of the invention.

The material handling apparatus here presented includes a winch 20, a so-called cargo winch as disclosed, steam engine mechanisms, denoted generally at 21, 21, a manual brake 22, and a lubricating construction and arrangement, represented at 23, for each of said steam engine mechanisms.

A winch bed construction 24 of the winch 20 is adapted to be suitably and conveniently supported, as, for example, upon the deck of a vessel. Side frame housings, denoted 25 and 26, respectively, are supported directly upon opposite sides of the winch bed construction 24 in spaced parallel relation to each other, and the winch 20 is situated between said side frame housings 25 and 26 directly above the winch bed construction 24. More explicitly, the side frame housing 25 is composed of two adjacent, upper, rearward hollow sections, denoted 27 and 28, respectively, and a lower, forward hollow section 29, and the side frame housing 26 is composed of an upper, rearward hollow section 30 and a lower, forward hollow section 31. The lower, forward hollow sections 29 and 31 are constituted as integral parts of the winch bed construction 24. The upper, rearward portions of the inner and outer walls of the lower, forward hollow sections 29 and 31 terminate in the same oblique plane which extends downwardly and rearwardly. The upper hollow sections 27 and 28 are suitably and conveniently bolted, or otherwise secured, to the lower hollow section 29, and the upper hollow section 30 is suitably and conveniently bolted, or otherwise secured, to the lower hollow section 31.

Figure 2:
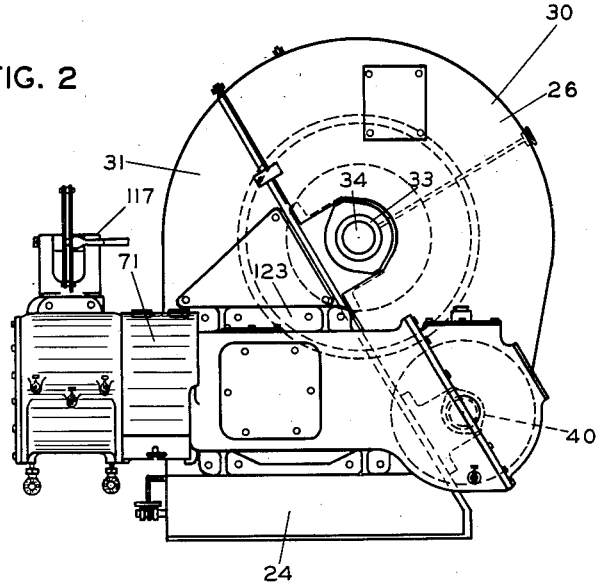
Fig. 2 is a side elevational view, on a reduced scale, of the material handling apparatus of Fig. 1.
Figure 3:
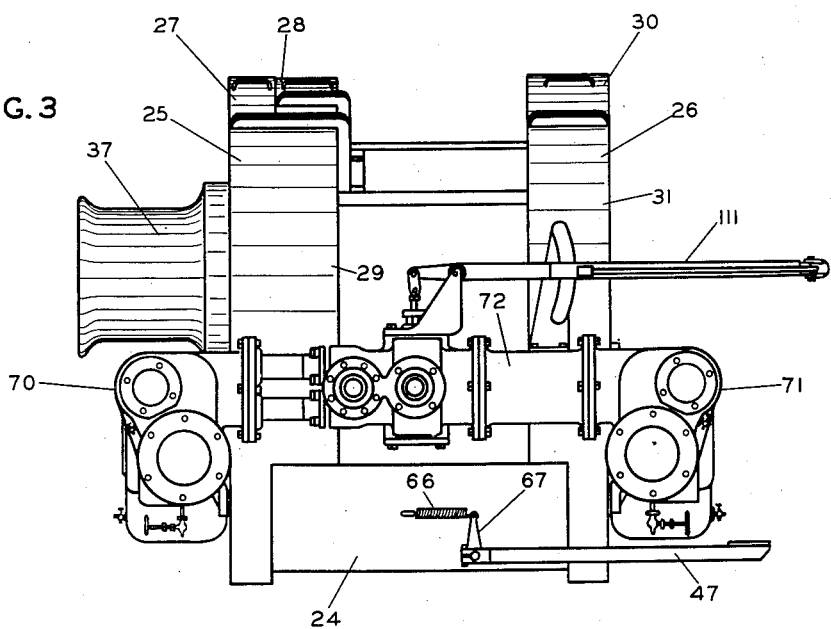
Fig. 3 is a front elevational view of the material handling apparatus.
Figure 4:
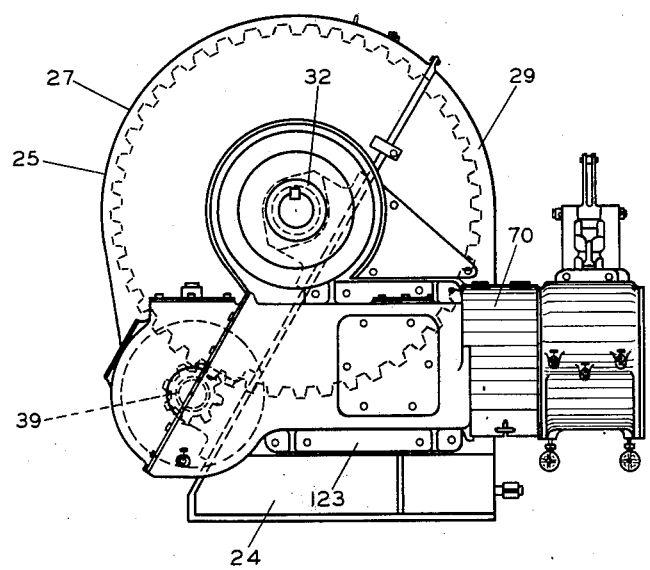
Fig. 4 is a side elevational view of the material handling apparatus disclosing the side thereof opposite the side disclosed in Fig. 2.
Figure 5:
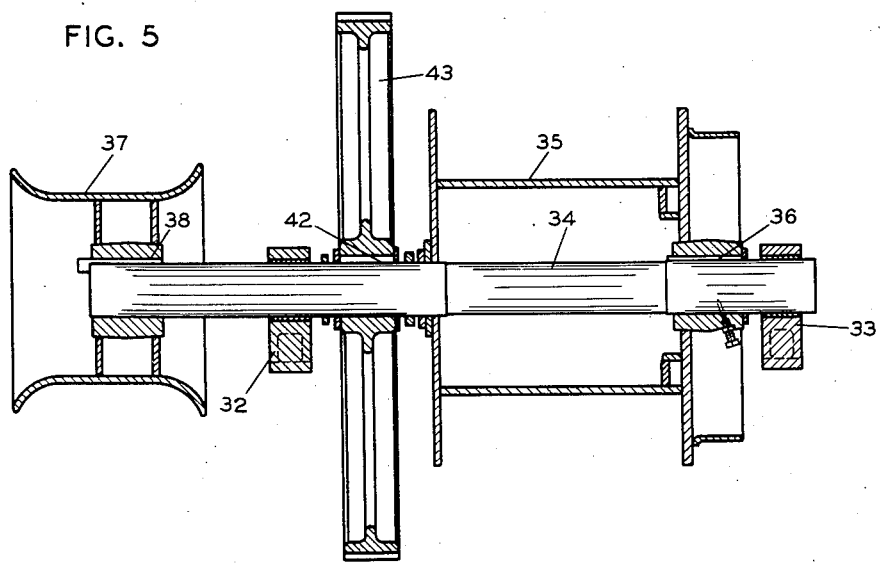
Fig. 5 is a sectional view detailing a drum and a winch head of the material handling apparatus and parts of said material handling apparatus associated with said drum and winch head.
Figure 11:
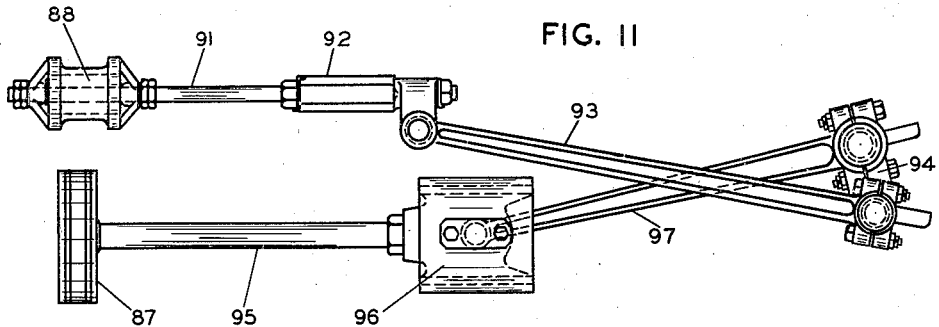
Fig. 11 is an elevational view detailing steam engine mechanism of the material handling apparatus.
Figure 12:
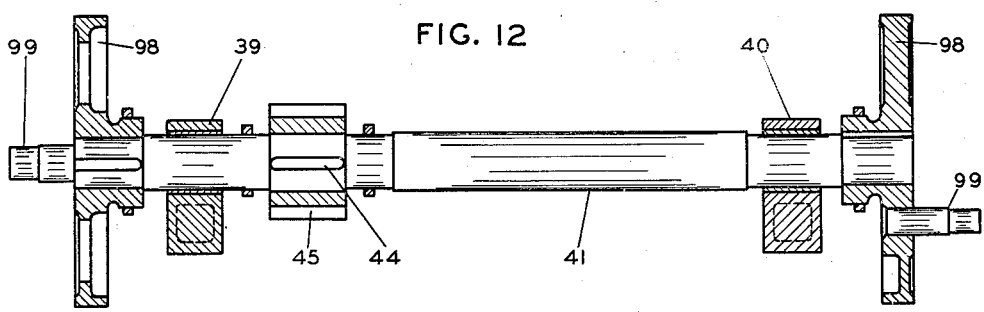
Fig. 12 is a sectional view detailing a crank shaft assembly of the material handling apparatus.
Figure 13:
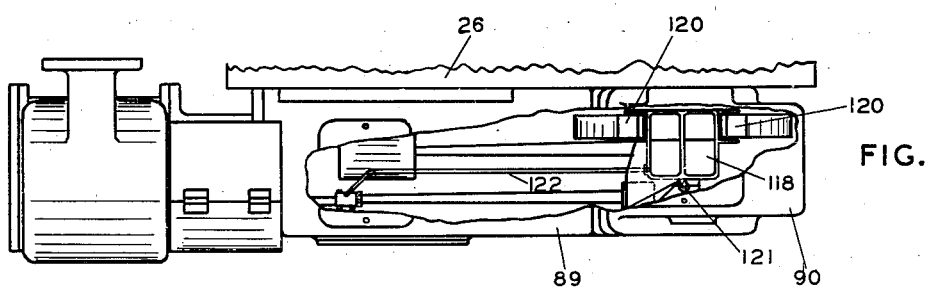
Fig. 13 is a fragmentary plan view, partially broken away, of a side housing of the material handling apparatus detailing a lubricating construction and arrangement of said material handling apparatus.
Figure 14:
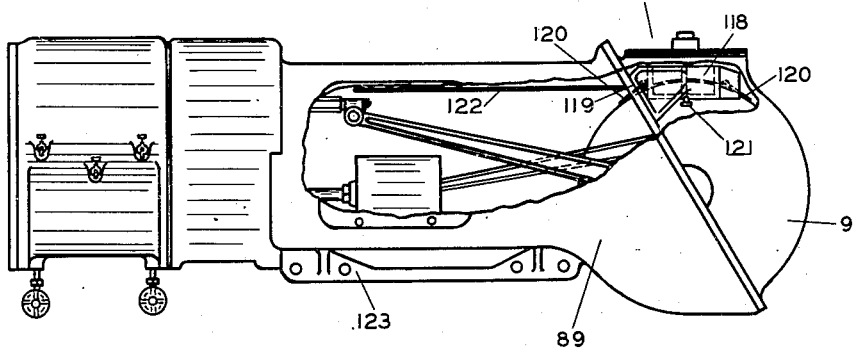
Fig. 14 is a side elevational view, partially broken away, of the disclosure of Fig. 13.
Figure 15:
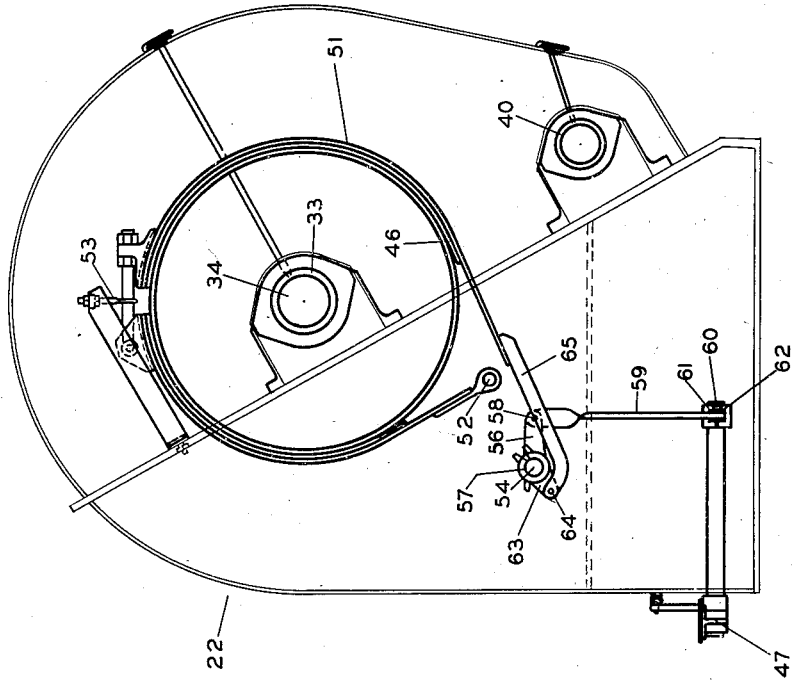
Fig. 15 is a side elevational view detailing a brake system and bearing supports of the material handling apparatus.
Figure 16:
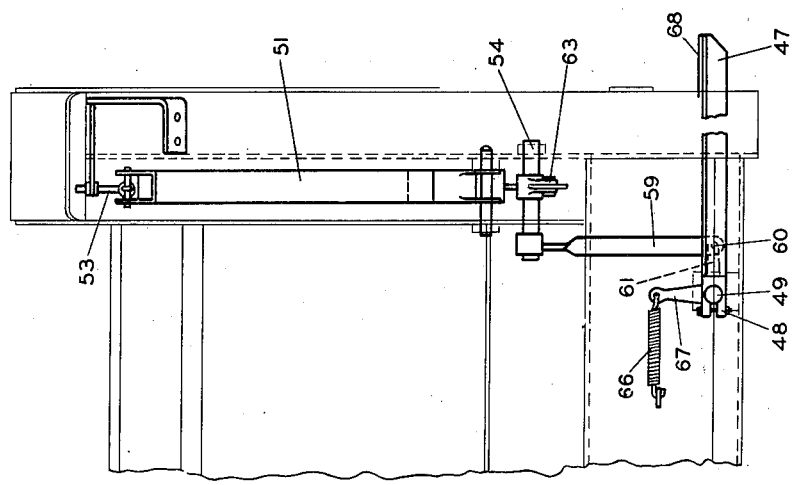
Fig. 16 is an edge view of the brake system disclosed in Fig. 15.

As disclosed in Figs. 1, 2, 4, 5 and 15 of the drawings, the lower hollow sections 29 and 31 of the side frame housings 25 and 26, respectively, suitably and conveniently include or provide spaced apart, oppositely disposed bearings, denoted 32 and 33, respectively, for a horizontal drum shaft 34 of the cargo winch disposed transversely of the material handling apparatus. A main drum 35 of said cargo winch, situated between the side frame housings 25 and 26, is fixed, as at 36, upon the horizontal drum shaft 34, and a winch head 37 of the cargo winch, situated at a side of the material handling apparatus, also is fixed as at 38, upon said horizontal drum shaft 34.

The winch head 37 is adapted to be employed for several purposes, including the purpose of actuating a cable (not shown) for adjusting a boom (also not shown) to an elevation where it is desired to locate the boom better to perform a material conveying or moving job to be done. The main drum 35 also is adapted to be employed for several purposes, by actuation of a cable (not shown) ridable on said main drum and over sheaves (not shown) supported, for example, upon a mast (not shown), for raising and lowering, or otherwise moving, material.

As disclosed in Figs. 1, 2, 4 and 15, said lower hollow sections 29 and 31 of said side frame housings 25 and 26, respectively, also suitably and conveniently include or provide spaced apart, oppositely disposed bearings, represented 39 and 40, respectively, for a horizontal crank shaft 41 of the cargo winch disposed parallelly of and considerably below the elevation of the horizontal drum shaft 34.

Said horizontal drum shaft 34 fixedly supports, as at 42, a gear 43, the horizontal crank shaft 41 fixedly supports, as at 44, a pinion 45, and said pinion 45 is in mesh with said gear 43. The gear 43 is situated within the side frame sections 28 and 29, between the bearing 32 and the main drum 35, the pinion 45 is situated within the side frame section 29, between the bearing 39 and said main drum 35, and said sections 28 and 29 constitute a case for said gear and pinion.

The main drum 35 includes an enlarged cylindrical end portion, situated within the side frame sections 30 and 31 of the side frame housing 26, constituted as an integral brake drum 46 of said main drum 35, and the manual brake 22 is adapted to the purpose of causing said brake drum 46 to be engaged thus to cause the main drum 35 and the winch head 37 to be brought to rest when this is intentional. Said manual brake 22 includes, in addition to the integral brake drum 46, a foot lever 47 secured, as at 48, to a horizontal shaft 49 rotatably supported, as at 50, upon the winch bed construction 24, an adjustable brake band 51 in surrounding relation to the integral brake drum 46, and an operative connection between the horizontal shaft 49 and the adjustable brake band 51. Said adjustable brake band 51 also is situated within said side frame sections 30 and 31. One end portion of the adjustable brake band 51 is anchored, at 52, to the side frame section 31, and mechanism 53 at an intermediate portion of said brake band is for the purpose of adjusting the overall length of the brake band. A horizontal shaft 54, at right angle relation to the horizontal shaft 49, is rotatably supported, as at 55, upon the winch bed construction 24. A crank 56 fixed, as at 57, upon the horizontal shaft 54 is pivoted, as at 58, to a link 59 itself pivoted, as at 60, to a short lever 61 fixed, as at 62, upon the horizontal shaft 49, and a crank 63 fixed to said horizontal shaft 54 is pivoted, as at 64, to an attachment piece 65 upon the end portion of the adjustable brake band 51 which is opposite the anchored end portion of said adjustable brake band. The construction and arrangement are such that the integral brake drum 46 will be engaged by the brake band 51 upon depression of the foot lever 47 and that said brake band will be removed from engagement with said integral brake drum, in response to actuation of a coil spring 66 secured to an arm 67 upon the horizontal shaft 49 and to the winch bed construction 24, upon release of said foot lever 47. As shown, the foot lever 47 extends along an end portion of the material handling apparatus, and an operating piece 68 for said foot lever is situated adjacent a corner of said apparatus. In some installations, it may be desirable to have the operating piece 68 situated adjacent a preferred corner of the apparatus. See the dotted line position of the operating piece in Fig. 1.

A rope guard and brace, represented generally at 69, of the material handling apparatus, between the side frame housings 25 and 26, may be of any ordinary or preferred construction.

The material handling apparatus includes side housings, denoted 70 and 71, respectively, and a front housing, designated 72, for steam engine mechanisms of said apparatus. The side housings 70 and 71 are rigidly supported, as at 123, by and up against the outer surfaces of the lower, forward sections 29 and 31 of the side frame housings 25 and 26, respectively, and the front housing 72 is rigidly supported by said side housings 70 and 71. That is to say, the opposite end portions of the front housing 72 are secured to the forward end portions of the side housings 70 and 71, respectively. As disclosed, the side housings 70 and 71 and the front housing 72 are in the same horizontal plane, and said front housing 72 is in spaced, parallel relation to the winch bed construction and in perpendicular relation to the side housings 70 and 71.

A throttle body of the front housing 72 is denoted 73, a throttle body head is represented 74, a manifold is designated 75, and spaced pipes are denoted 76, 76. Separate pipe sections 77, 78 lead from a valve cage 79 of the throttle body 73 to separate pipe sections 80, 81 of the manifold 75. And, similarly, separate pipe sections (not shown) lead from said valve cage 79 to the spaced pipes 76, 76. The manifold 75 is bolted, as at 82, or otherwise secured, up against one end of the throttle body 73, the spaced pipes 76, 76 are bolted, as at 83, or otherwise secured, up against the opposite end of said throttle body 73, and the ends of said spaced pipes 76, 76 opposite or spaced from the throttle body are integrally connected by a double pipe flange 84.

Each of the side housings 70, 71 includes cylinders 85 alined with the pipe sections 80, 81, respectively; or the pipes 76, 76, respectively, as the case may be; and a steam chest 86 integral with said cylinders 85 and containing a piston 87 and a valve 88 of the steam engine mechanism for actuating the horizontal drum shaft 34. The cylinders 85, 85 are bolted, as at 124, or otherwise secured, up against the outer ends of the separate pipe sections 80, 81 and the double pipe flange 84 upon the spaced pipes 76, 76, respectively, and the steam chests 86, 86 are bolted, as at 125, or otherwise secured, up against the forward ends of casings 89 of the side housings 70, 71.

Each of the casings 89 contains parts of steam engine mechanism additional to the parts before mentioned, and a cover for each casing 89 is denoted 90. More explicitly, each casing 89 suitably and conveniently houses parts of a valve motion assembly additional to the valve 88, including a valve rod 91, a valve rod guide 92, an eccentric rod 93 and an eccentric crank 94, as well as a piston rod 95 upon the corresponding piston 87, a cross head 96, a connecting rod 97, and a crank disc 98 having a crank pin 99. The crank discs 98, 98 in the different side housings 70, 71, respectively, are fixed upon the opposite end portions of the horizontal crank shaft 41, and the eccentric crank 94 and the connecting rod 97 are, in the instance of the steam engine mechanism in each of said side housings 70, 71, suitably and conveniently connected to the crank pin 99.

A steam inlet to the throttle body 73 is denoted 100, and an exhaust outlet from said throttle body is designated 101. The steam inlet 100 opens to passageways 102 leading to the valve cage 79, and passageways 103 lead from said valve cage to the exhaust outlet 101. A tubular bushing 104 within the valve cage 79 includes central ports, one shown at 105, which afford communication between the passageways 102 and the interior of said tubular bushing 104, and a generally cylindrical throttle valve 106 is snugly slidably situated within the tubular bushing 104. The generally cylindrical throttle valve 106 includes steam receiving chambers, one of which is denoted 107, each provided by spaced members 108, 108 of the cylindrical throttle valve and alined with a central port 105. The tubular bushing 104 also includes end ports, represented 109 and 110, respectively, adapted to afford communication between the interior of the valve cage and the pipe sections 77 and 78, as well as between said valve cage interior and the pipe sections (not shown) of the throttle body at the left in Fig. 7.

The specific construction and mode of operation of the steam engine mechanisms forms no part of the present invention. Suffice it to say than when the throttle valve 106 is situated as in Fig. 7, the ports 105 are shut off from all of the ports 109 and 110 and the steam engines are inoperative; that the crank discs 98, 98 are adapted to be rotated in one direction when said throttle valve 106 is elevated to cause the ports 105 to be open by way of the chambers 107 to the ports 109 and the ports 110 to be open to the exhaust outlet; and that said crank discs are adapted to be rotated in opposite direction when the throttle valve is depressed to cause the ports 105 to be open by way of said chambers 107 to the ports 110 and the ports 109 to be open to said exhaust outlet. The steam engine parts can be of any ordinary or preferred construction. Essentially, the steam engine mechanisms will include features and characteristics of the general nature as has been set forth. The valves 88, 88 and the parts associated with said valves and the pistons 87, 87 and the parts associated with said pistons are adapted to perform their functions in a manner well known in the present art. Stated simply, the side housings 70, 71 and the front housing 72 will contain steam engine mechanisms of ordinary or preferred type.

An operating lever 111 for actuating the generally cylindrical throttle valve 106 is pivotally supported, as at 112, upon the throttle body head 74. A short arm of said operating lever 111 is pivotally connected through links 113 with a valve rod 114 secured to said throttle valve 106, and a long arm 115 of the operating lever is slidable along a quadrant 116 supported upon the manifold 75. A releasable latch for the long arm 115 of the operating lever 111 is represented generally at 117.

Each of the side housings 70, 71 incorporates a lubricating construction and arrangement situated within the casing 89 and its cover 90. Each casing with cover is adapted to receive lubricating oil, and contains an oil well 118 in its upper portion above the corresponding crank disc 98. The oil wells 118 are supported, as at 119, in any suitable and convenient manner, within the side housings 70, 71, and spout plates 120, 120 extend obliquely downwardly and outwardly from the opposite ends of sides of the corresponding oil well so that the free outer ends of the spout plates are engaged against a circumferential surface of the corresponding crank disc 98. The construction and arrangement are such that lubricating oil will be elevated to each oil well 118 in response to rotation of the corresponding crank disc in either direction. That is, each crank disc while rotating is adapted to lift lubricating oil out of the lower portion of the casing, and the spout plate toward which the crank disc rotates is adapted to cause oil to be removed by wiping from the crank disc and deposited by centrifugal force into the oil well. An oil outlet 121 from each oil well 118 is situated directly over the eccentric crank 94, etc., and an oil pipe 122 from each oil well is adapted to deposit oil from the well upon the connection between the corresponding valve rod 91 and eccentric rod 93, etc. Evidently, operative parts of the steam engine mechanisms above the oil level in the crank cases of the housings 70, 71 will become lubricated in response to rotation of the crank discs 98, 98 while immersed in the crank case lubricating oil.

The disclosure as made is of a so-called right hand winch. For a left hand winch, the steam inlet, the winch head and the control would be as shown in dotted lines in Fig. 1.

Ordinarily, elevation of the operating lever 111, to cause the throttle valve 106 to be depressed, is adapted to cause the steam engine mechanisms to be actuated to rotate the crank discs 98, 98 in the load lifting direction of the main drum 35, and vice versa. That is to say, the construction and arrangement ordinarily will be such that when it is the intention of an operator to cause a load to be elevated, he will pull upwardly on the operating lever 111, and vice versa.

The main drum 35 evidently is adapted to be rotated, in either direction, through the instrumentality of the crank pins 99, 99 on the crank discs 98, 98, when simultaneously driven by the steam engine mechanisms, the crank shaft 41, the pinion 45, the gear 43 and the horizontal drum shaft 34. The steam engine mechanisms are employable, in a manner well known in the art, to retain a load at any selected elevation, and the manual brake 22 constitutes an additional or auxiliary instrumentality for arresting a load.

The side frame housings 25 and 26 are rigid with the winch bed construction 24, the side housings 70 and 71 are rigid with said side frame housings and said winch bed construction, and the front housing 72 is rigid with forward portions of said side housings. The material handling apparatus as a whole, including the steam engine mechanisms, is constituted as a very stable and substantial construction. Provision for ample lubrication of the steam engine parts is included, the material handling apparatus is designed to be capable of operating efficiently and satisfactorily during long and continued heavy usage, and the construction is simple and compact. None of the operating or moving parts is exposed.

What is claimed is:

1. In material handling apparatus including a drum to be rotated, spaced apart members one of which is constituted as a side housing at right angular relation to said drum, a drum shaft rotatably mounted upon and between said spaced apart members rigidly supporting said drum, a gear upon said drum shaft and in said side housing, a shaft rotatably mounted upon and between said spaced apart members, a pinion upon said shaft and in said side housing in mesh with said gear, casings supported by and up against said spaced apart members at the outer sides of and in parallel relation to the spaced apart members, spaced apart rotatable elements fixed upon said shaft at the outer sides of said spaced apart members and situated in said casings, respectively, and steam engine mechanisms in said casings for driving said rotatable elements.

2. In material handling apparatus including a drum to be rotated, spaced apart first side housings at right angular relation to said drum, a drum shaft rotatably mounted upon and between said spaced apart first side housings rigidly supporting said drum, a gear upon said drum shaft and in one of said first side housings, a shaft rotatably mounted upon and between said first side housings, a pinion upon said shaft and in the first side housing having said gear in mesh with the gear, a brake drum integral with said drum and in the first side housing other than the one having said gear, spaced apart second side housings supported by and up against said spaced apart first side housings at the outer side of and in parallel relation thereto, spaced apart rotatable elements fixed upon said shaft at the outer sides of said first side housings and situated in said second side housings, respectively, and steam engine mechanisms in said second side housings for driving said rotatable elements.

3. In material handling apparatus including a drum to be rotated, spaced apart members one of which is constituted as a side housing, a drum shaft rotatably mounted upon and between said spaced apart members rigidly supporting said drum, a gear upon said drum shaft and in said side housing, a shaft rotatably mounted upon and between said spaced apart members, a pinion upon said shaft and in said side housing in mesh with said gear, side casings supported by said spaced apart members at their outer sides, spaced apart rotatable elements fixed upon said shaft and situated in said casings, respectively, and steam engine mechanisms in said casings for driving said rotatable elements.

HARRY KNUTSON.

REFERENCES CITED

The following references are of record in the file of this patent:

UNITED STATES PATENTS

| Number | Name | Date |
|---|---|---|
| 688,434 | Parsons | Dec. 10, 1901 |
| 1,906,947 | Cunningham | May 2, 1933 |
| 1,920,363 | Dean | Aug. 1, 1933 |
| 2,352,395 | Ljungkull | June 27, 1944 |
| 2,379,858 | Banzhaf et al. | July 10, 1945 |

FOREIGN PATENTS

| Number | Country | Date |
|---|---|---|
| 188,968 | Great Britain | Nov. 23, 1922 |
| 620,026 | Germany | Oct. 11, 1935 |